United States Patent
Minster et al.

(10) Patent No.: US 10,632,992 B2
(45) Date of Patent: Apr. 28, 2020

(54) AUTONOMOUS VEHICLE THAT INCLUDES SENSOR OUTPUT BATCHING SYSTEM

(71) Applicant: GM GLOBAL TECHNOLOGY OPERATIONS LLC, Detroit, MI (US)

(72) Inventors: Gautier Etienne Guillaume Minster, San Francisco, CA (US); Peter Ming Gao, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/049,765

(22) Filed: Jul. 30, 2018

(65) Prior Publication Data
US 2020/0031338 A1 Jan. 30, 2020

(51) Int. Cl.
| | |
|---|---|
| *B60W 30/09* | (2012.01) |
| *G06K 9/62* | (2006.01) |
| *G06K 9/00* | (2006.01) |
| *B60W 10/04* | (2006.01) |
| *B60W 10/20* | (2006.01) |
| *G08G 1/16* | (2006.01) |
| *B60W 10/18* | (2012.01) |

(52) U.S. Cl.
CPC ............ *B60W 30/09* (2013.01); *B60W 10/04* (2013.01); *B60W 10/18* (2013.01); *B60W 10/20* (2013.01); *G06K 9/00805* (2013.01); *G06K 9/6268* (2013.01); *G06K 9/6293* (2013.01); *G08G 1/165* (2013.01); *G08G 1/166* (2013.01); *B60W 2420/42* (2013.01); *B60W 2550/10* (2013.01)

(58) Field of Classification Search
None
See application file for complete search history.

(56) References Cited

U.S. PATENT DOCUMENTS

| | | | |
|---|---|---|---|
| 2015/0244826 A1* | 8/2015 | Stenneth | H04Q 9/00 709/213 |
| 2016/0096270 A1* | 4/2016 | Ibarz Gabardos | B25J 9/163 700/253 |
| 2018/0261020 A1* | 9/2018 | Petousis | G07C 5/008 |

* cited by examiner

Primary Examiner — Tamara L Weber
(74) Attorney, Agent, or Firm — Medley, Behrens & Lewis, LLC

(57) ABSTRACT

An autonomous vehicle is described herein. The autonomous vehicle includes several sensor systems that asynchronously generate sensor system outputs. A batch generator system, executed by a processor, identifies batches of sensor system outputs to provide to an object classifier system, wherein the batches of sensor system outputs are identified based upon timing estimates, wherein the timing estimates include first timing estimates and second timing estimates. The first timing estimates include estimates of amounts of time needed by the object classifier system to complete processing of batches of different sizes. The second timing estimates includes estimates of when sensor system outputs are expected to be received from the several sensor systems.

20 Claims, 5 Drawing Sheets

AUTONOMOUS VEHICLE THAT INCLUDES SENSOR OUTPUT BATCHING SYSTEM

BACKGROUND

An autonomous vehicle is a motorized vehicle that can operate without human conduction. An exemplary autonomous vehicle includes a plurality of sensor systems, wherein the sensor systems can include, but are not limited to, a lidar sensor system, a camera sensor system, and a radar sensor system. The autonomous vehicle navigates over roadways based upon sensor signals output by the sensor systems.

Unexpected events often arise when vehicles (e.g., both human-conducted vehicles and autonomous vehicles) travel over travel paths. Exemplary unexpected events can include an animal running into a roadway, a vehicle unexpectedly changing lanes, a stoplight quickly altering from green to red, etc. Due to the possibility of occurrence of unexpected events, sensor system outputs generated by the aforementioned sensor systems should be processed quickly to allow for the autonomous vehicle to react to such unexpected events. Processing sensor system outputs includes object classification, wherein a sensor system output (e.g., an image) is provided to an object classifier system, and further wherein the object classifier system is configured to assign labels to objects represented in the sensor system output (e.g., where the labels indicate whether the object is a static object, a car, a truck, a bus, a bike, a pedestrian, etc.).

Processing sensor system output generated by sensor systems of an autonomous vehicle, however, is non-trivial, at least partially due to: 1) how sensor systems generate sensor systems outputs; and 2) inefficiencies of classifier systems when assigning labels to objects represented in sensor system outputs. In an exemplary embodiment, an autonomous vehicle includes four image sensor systems positioned about the autonomous vehicle, wherein the image sensor systems asynchronously generate images at a certain rate (e.g., 10 Hz). As mentioned previously, these images should be processed as quickly as possible. The asynchronous nature in which the image sensor systems output images, however, renders it difficult for an object classifier system to process the images efficiently (wherein processing an image involves receiving the image, assigning labels to objects represented in the image, and outputting the labels). Specifically, the object classifier system is unable to start processing one image until the processing of another image (previously provided to the object classifier system) has completed. An exemplary approach to allow for real-time processing of sensor system outputs is to overprovision computing resources—for instance, each image sensor system can have a respective object classifier system assigned thereto, such that an object classifier system is dedicated to processing images output by a single image sensor system. Such an approach is an inefficient use of computing resources, as each object classifier system may remain idle for relatively long periods of time.

SUMMARY

The following is a brief summary of subject matter that is described in greater detail herein. This summary is not intended to be limiting as to the scope of the claims.

Described herein are various technologies pertaining to controlling an autonomous vehicle based upon sensor system outputs from multiple sensor systems positioned about an autonomous vehicle. With more specificity, described herein are technologies relating to batching sensor system outputs for provision to an object classifier system, wherein the sensor system outputs are batched to: 1) facilitate real-time processing of the sensor system outputs by minimizing an exit delay across all sensor system outputs; and 2) facilitate efficient utilization of computing resources.

With more specificity, the object classifier system can be configured to assign labels to objects represented in sensor system outputs (such as images). Because of overhead required to initiate the object classifier system when new sensor system output(s) are received, the average time for the object classifier system to assign labels to objects represented in sensor system outputs decreases as more sensor system outputs are included in a batch that is provided to the object classifier system. For instance, when the object classifier system is provided with a first batch consisting of a single image, the object classifier system may complete processing of the first batch in 35 ms. In contrast, when the object classifier system is provided with a second batch consisting of two images, the object classifier system may complete processing of the second batch in 50 ms. Hence, the average time for the object classifier system to process each image in the second batch is 25 ms, while the average time to process the image in the first batch is 35 ms. Therefore, computational efficiency of the object classifier system increases as a batch size (number of images) of a batch provided to the object classifier system increases.

Additionally, however, it is desirable for the object classifier system to complete processing of each sensor system output as soon as possible, and therefore it is undesirable to wait for a long period of time until a large number of sensor system outputs are received from the sensor systems. The sensor systems of the autonomous vehicle described herein, however, asynchronously output sensor system outputs. Accordingly, even though the sensor systems may generate sensor system outputs at the same rate, the sensor systems generate their respective sensor system outputs at different times. Therefore, the object classifier system receives the sensor system outputs at different times, forcing at least some delay if multiple sensor system outputs are to be included together in a batch.

Described herein are technologies that are configured to batch sensor system outputs from multiple sensor systems in a manner that ensures that each sensor system output is processed by the object classifier system (and therefore sensor system outputs are not buffered for an extended length of time). Additionally, in an example, the technologies described herein are configured to batch the sensor system outputs to minimize the average exit delay across the sensor system outputs. The exit delay is an amount of time between: 1) when a sensor system output is ready for processing by the object classifier system; and 2) when the object classifier system completes processing of the sensor system output (e.g., the object classifier system outputs labels for object(s) represented in the sensor system output).

An exemplary process for batching sensor system outputs is now set forth. An indication is received from the object classifier system that the object classifier system is idle (e.g., the object classifier system has finished processing of sensor system output(s) previously provided to the object classifier system). Responsive to receiving such indication, a buffer is reviewed to ascertain a number of sensor system outputs that are in the buffer, and to further ascertain times that the sensor system outputs were placed in the buffer. In the event that the buffer includes a maximum number of sensor system outputs (e.g., the number of sensor system outputs in the buffer is equivalent to the number of sensor systems), a batch is immediately formed, wherein the batch consists of all of the sensor system outputs that are in the buffer.

When the buffer includes fewer than the maximum number of sensor system outputs, multiple time estimates are received, and a determination as to how many sensor system outputs to include in a batch and when to provide the batch to the object classifier system is made based upon the time estimates. For instance, the multiple time estimates include first time estimates, wherein the first time estimates indicate when (future) sensor system outputs, generated by the sensor systems, are expected to be received. The first time estimates are based upon times that sensor system outputs from the sensor systems were previously received and rates at which the sensor systems generate sensor system outputs. Additionally, the time estimates include second time estimates, wherein the second time estimates indicate an estimated amount of time needed by the object classifier system to complete processing of batches of different batch sizes. Accordingly, the second time estimates include: 1) a first time estimate that is indicative of an estimated amount of time needed to process a batch that consists of one sensor system output; 2) a second time estimate that is indicative of an estimated amount of time needed to process a batch that consists of two sensor system outputs; 3) a third time estimate that is indicative of an estimated amount of time needed to process a batch that consists of three sensor system outputs, etc.

Based upon the number of sensor system outputs in the buffer, when the sensor system outputs in the buffer were placed in the buffer, and the time estimates, a determination is made as to how many sensor system outputs to include in a batch and when to provide the batch to the object classifier system. In an example, the buffer may include a first sensor system output, and the first time estimates can indicate that a second sensor system output is expected to be received in a relatively short amount of time. Further, the combination of the first time estimates and the second time estimates can indicate that the average exit delay for the first and second sensor outputs will be lower if the first and second system sensor outputs are placed together in a batch and provided to the object classifier system compared to if the first and second sensor system outputs are provided separately to the object classifier system (e.g., the average exit delay for the first and second sensor outputs is minimized by waiting to receive the second sensor system output and including the two sensor system outputs in a batch).

The object classifier system then processes the sensor system outputs in the batch, such that the object classifier system assigns labels to objects represented in the sensor system outputs in the batch. A control system of the autonomous vehicle can then control at least one of an engine, a braking system, or a steering system of the autonomous vehicle based upon the labels assigned to the objects by the object classifier system. After the object classifier system completes processing of the batch, the object classifier system outputs an indication that the object classifier system is idle. The process set forth above is repeated, and another batch is provided to the object classifier system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
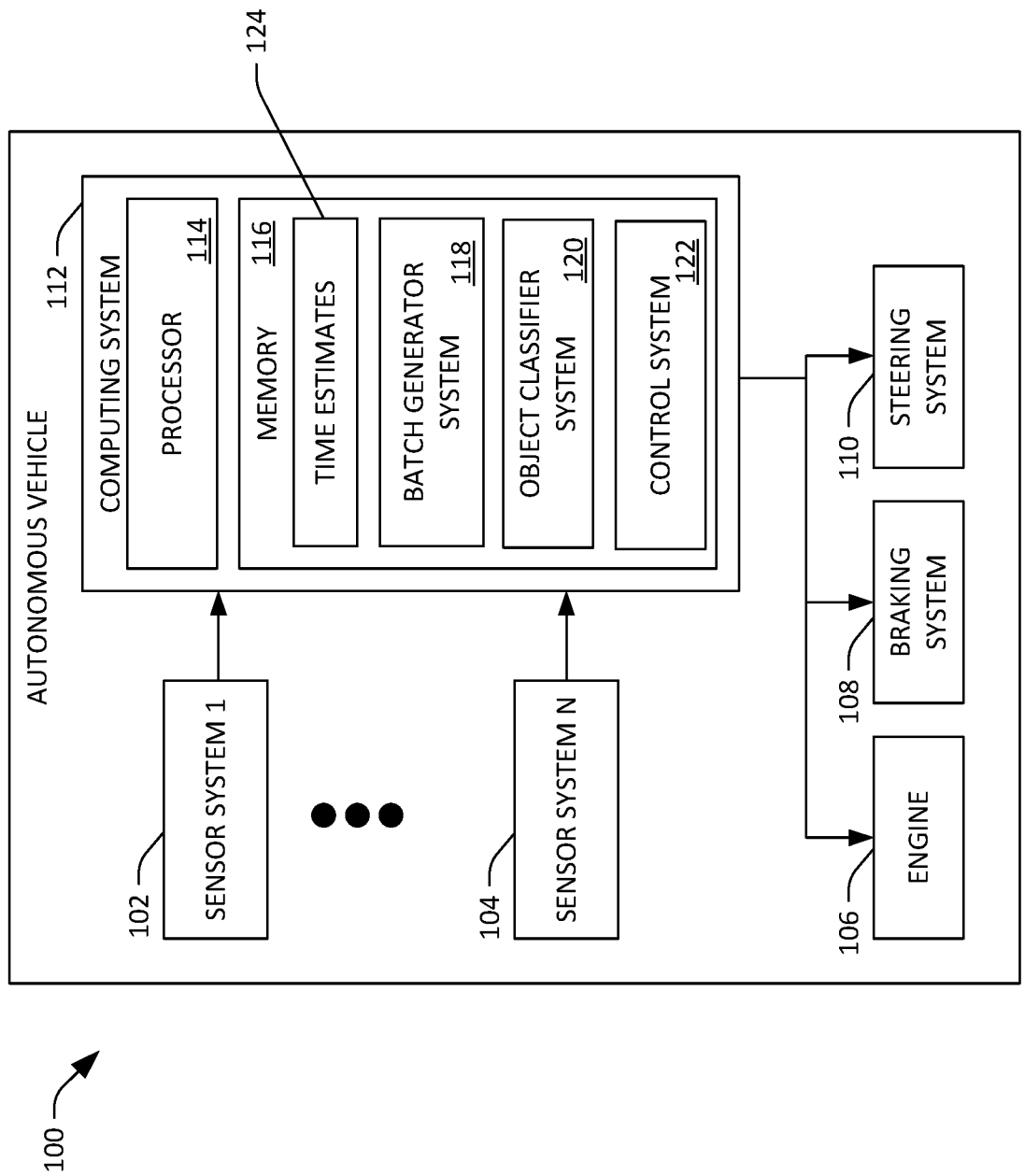
FIG. 1 is a functional block diagram of an exemplary autonomous vehicle.

Various technologies pertaining to creating batches of sensor system outputs and controlling an autonomous vehicle based upon such batches are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor system outputs generated by sensor systems of the autonomous vehicle 100. The autonomous vehicle 100 includes a plurality of sensor systems 102-104 (a first sensor system 102 through an nth sensor system 104). While the autonomous vehicle 100 can include several different types of sensor systems, such as image (camera) sensor systems, lidar sensor systems, radar sensor systems, GPS sensor systems, sonar sensor systems, infrared sensor systems, and the like, for purposes of explanation the sensor systems 102-104 are described herein as being of the same type. In a specific example, the sensor systems 102-104 can be image sensor systems. The sensor systems 102-104 are arranged about the autonomous vehicle 100 to obtain information regarding different regions of the environment surrounding the autonomous vehicle 100.

The autonomous vehicle 100 further includes several mechanical systems that are used to effectuate appropriate motion of the autonomous vehicle 100 as the autonomous vehicle 100 navigates about roadways. For instance, the mechanical systems can include, but are not limited to, an engine 106, a braking system 108, and a steering system 110. The engine 106 may be an electric engine or a combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104, and is further in communication with the engine 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 has a batch generator system 118, an object classifier system 120, and a control system 122 loaded therein. Briefly, the batch generator system 118 is configured to receive sensor system outputs generated by the sensor systems 102-104. For instance, the batch generator system 118 can be configured to receive images generated by image sensor systems. Each of the image sensor systems can output images at a rate, wherein the rate can be the same across all image sensor systems (e.g., 10 Hz). In another example, at least some of the image sensor systems can output images at different rates. Further, the image sensor systems can asynchronously output images. Therefore, even when the image sensor systems output images at the same rate, the batch generator system 118 receives the images at different times. The batch generator system 118 is configured to generate batches of sensor system outputs (images) and provide such batches to the object classifier system 120.

The object classifier system 120, in an example, can be or include an artificial neural network (ANN), wherein the ANN can be a recurrent neural network (RNN) or any other suitable type of neural network. The object classifier system 120 is configured to assign labels to objects represented in sensor system outputs received from the batch generator system 118. The object classifier system 120 processes batches of sensor system outputs more efficiently as a number of sensor system outputs in batches increases. In other words, an average amount of time for the object classifier system 120 to process sensor system outputs decreases as batch size (the number of sensor system outputs in a batch) of batches provided to the object classifier system 120 by the batch generator system 118 increases. In a specific example, the object classifier system 120 is able to complete processing of a batch consisting of a single sensor system output in approximately 35 ms, while the classifier system 120 is able to complete processing of a batch of consisting of two sensor system outputs in approximately 50 ms. Hence, in this example, an average time for the object classifier system 120 to process sensor system outputs decreases from 35 ms to 25 ms as a batch size increases from one to two. The average amount of time for the classifier system 120 to process sensor system outputs continuously decreases as the size of the batch provided to the classifier system 120 by the batch generator system 118 increases. The correlation between batch size and computational efficiency is due to overhead incurred as the processor 114, for each batch, sets up computations and transfers data when executing the object classifier system 120.

The control system 122 is configured to control the engine 106, the braking system 108, and/or the steering system 110 based upon labels assigned to objects represented in sensor system outputs by the object classifier system 120. For instance, the control system 122 can control the engine 106, the braking system 108, and/or the steering system 110 based upon the object classifier system 120 assigning a label to sensor system output that indicates that a pedestrian is represented in the sensor system output.

Additional detail is now set forth with respect to the batch generator system 118. The batch generator system 118 is configured to consider several factors when generating batches of sensor system outputs for provision to the object classifier system 120. Specifically, the batch generator system 118 is configured to facilitate real-time processing of sensor system outputs. In other words, the batch generator system 118 is configured to provide batches to the object classifier system 120 such that the object classifier system 120 processes each sensor system output generated by the sensor systems 102-104, while also ensuring that a buffer of sensor system outputs does not include multiple sensor system outputs from any one sensor system (e.g., wherein the buffer of sensor system outputs includes sensor system outputs that are ready for processing by the object classifier system 120). The batch generator system 118 is further configured to take into consideration exit delay for sensor system outputs generated by the sensor systems 102-104 when batching sensor outputs. In a specific example, the batch generator system 118 can be configured to minimize an average exit delay for sensor system outputs generated by the sensor systems 102-104 when batching sensor system outputs.

Figure 2:
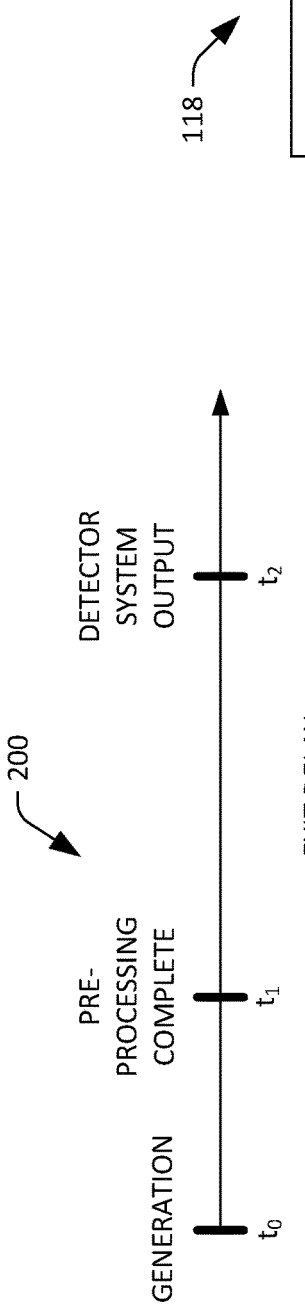
FIG. 2 is a schematic illustrating an exit delay for sensor system output, wherein the exit delay is an amount of time between when sensor system output is ready for processing by an object classifier system and when the object classifier system completes processing of the sensor system output.

Referring briefly to FIG. 2, a schematic 200 that presents an illustration of exit delay is illustrated. At a first point in time $t_0$, one of the sensor systems 102-104 generates a sensor system output, whereupon pre-processing is performed on the sensor system output. Exemplary pre-processing acts include noise removal, normalization, etc. Pre-processing of the sensor system output completes at time $t_1$, whereupon the (pre-processed) sensor system output is ready for provisioning to the object classifier system 120. Some time after $t_1$, the sensor system output is provided to the object classifier system 120 by the batch generator system 118, and the object classifier system completes processing of the sensor system output at time $t_2$. The exit delay is the amount of time from $t_1$ to $t_2$. It can be ascertained that the exit delay is based upon several factors, including (but not limited to): 1) an amount of time the sensor system output is buffered (e.g., due to the batch generator system 118 waiting for another sensor system output to batch with the sensor system output or due to the object classifier system 120 processing other sensor system output(s) when the sensor system output is received); and 2) an amount of time taken by the classifier system 120 to complete processing of a batch that includes the sensor system output. Therefore, in summary, the batch generator system 118 is configured to ensure that each sensor system output is processed within 2T of the sensor system output being ready for provision to the object classifier system 120 (where T is the period at which a sensor system outputs a sensor system output) to facilitate real-time processing, while also taking into consideration computing efficiencies gained when sensor system outputs are batched for provision to the object classifier system 120, such that the average exit delay across sensor system outputs is minimized.

Returning to FIG. 1, the memory 116 also includes time estimates 124, wherein the batch generator system 118 determines a number of sensor system outputs to include in a batch, and further determines a time when the batch is to be provided to the object classifier system 120, based upon the time estimates 124. The time estimates 124 comprise first time estimates and second time estimates. The first time estimates are indicative of when (future) sensor system outputs are expected to be ready for provisioning to the object classifier system 120. The first time estimates include at least one time estimate for each of the sensor systems 102-104, although it is contemplated that the first time estimate can include multiple time estimates for each of the sensor systems 102-104. The first time estimates are based upon known rate(s) that the sensor systems 102-104 generate sensor system outputs. In an example, the first sensor system 102 may generate a sensor system output every 100 ms. Upon the batch generator system 118 receiving a first sensor system output generated by the first sensor system 102 (e.g., after pre-processing has been completed on the first sensor system output), the batch generator system 118 can generate an estimate of when a second (next) sensor system output (generated by the first sensor system 102) is expected to be received at the batch generator system 118. The batch generator system 118 can generate the estimate by identifying the time that the first sensor system output was received at the batch generator system 118 and adding 100 ms to such time. It can be ascertained that the estimate is likely to be fairly accurate but not exact, as sensor systems are subject to drift, and further as time needed to complete pre-processing may differ across different sensor system outputs.

The second time estimates include estimates for amounts of time expected to be taken by the object classifier system 120 to complete processing of batches of different sizes. Therefore, when the sensor systems 102-104 consist of four sensor systems, the second time estimates can include four estimates: a first estimate of an amount of time for the object classifier system 120 to process a batch consisting of a single sensor system output; a second estimate of an amount of time for the object classifier system 120 to process a batch consisting of two sensor system outputs; a third estimate of an amount of time for the object classifier system 120 to process a batch consisting of three sensor system outputs; and a fourth estimate of an amount of time for the object classifier system 120 to process a batch consisting of four sensor system outputs. The number of estimates in the second time estimates is equivalent to the number of sensor systems in the plurality of sensor systems 102-104.

Exemplary operation of the autonomous vehicle 100 is now set forth. The object classifier system 120 can complete processing of a batch and can output an indication that the object classifier system 120 is idle, wherein such indication is received by the the batch generator system 118. Responsive to receiving such indication, the batch generator system 118 accesses a buffer, wherein the buffer is configured to retain sensor system output(s) that are ready for processing by the object classifier system 120 but have yet to be provided to the object classifier system 120. The batch generator system 118 identifies a number of sensor system outputs in the buffer, as well as times when the sensor system outputs were placed in the buffer. In the event that the buffer includes a maximum number (p) of sensor system outputs (e.g., the number of sensor system outputs in the buffer is equivalent to the number of sensor systems in the sensor systems 102-104), the batch generator system 118 creates a batch that includes all of the sensor system outputs in the buffer and provides such batch to the object classifier system 120 for processing. Therefore, in an example, when the sensor systems 102-104 consist of four image sensor systems and the buffer includes four images (one from each image sensor system), the batch generator system 118 generates a batch consisting of the four images and provides the batch to the object classifier system 120, whereupon the object classifier system 120 processes the batch.

When the buffer includes m sensor system outputs (where m is greater than zero but less than p), the batch generator system 118 accesses the timing estimates 124 and makes a determination as to whether to immediately create a batch that consists of the m sensor system outputs in the buffer or wait for one or more sensor system outputs to be received, wherein the batch generator system 118 makes such determination based upon m, when the m sensor system outputs were placed in the buffer, and the time estimates 124. Specifically, the batch generator system 118 computes the expected average exit delay for the m sensor system outputs in the buffer if the batch generator system 118 were to immediately provide a batch consisting of the m sensor system outputs to the object classifier system 120 (based upon an estimate in the second timing estimates as to an estimated amount of time for the object classifier system 120 to complete processing of a batch of size m).

The batch generator system 118 then computes the expected average exit delay if the batch generator system 118 were to await a next sensor system output and include such next sensor system output in a batch (with the m sensor system outputs), wherein such computation is based upon m, the times that the m sensor system outputs were placed in the buffer, and the time estimates 124. Specifically, the batch generator system 118 determines, from the first time estimates, how far in the future the next sensor system output is expected to be received. In the event that the next sensor system output is not expected to be received until after the object classifier system 120 will have completed processing of a batch of m sensor system outputs, the batch generator system 118 provides the batch of m sensor system outputs to the object classifier system 120 for processing. In the event that the next sensor system output is expected to be received prior to when the object classifier system 120 would complete processing of the batch consisting of the m sensor system outputs, the batch generator system 118 determines, from the second time estimates, an estimated amount of time for the object classifier system 120 to process a batch of size m+1.

The batch generator system 118 computes the expected average exit delay for sensor system outputs in the m+1 sensor system outputs based upon: 1) times when sensor system outputs were placed in the buffer; 2) how far in the future the next sensor system output is expected to be received; and 3) the estimated amount of time for the object classifier system 120 to process a batch of size m+1. The batch generator system 118 can iterate this process until m=p, and then select a batch size for provision to the object classifier system 120 (and thus a time to provide the batch to the object classifier system 120).

In another example, the batch generator system 118 can analyze a time window into the future, test hypothetical batch combinations, and then select the batch combination from the batch combinations that results in the lowest average exit delay for sensor system outputs (while ensuring that the buffer will never include more than one sensor system output from any one sensor system). This process can be repeated using a rolling time window, such that the batch generator system 118 tests hypothetical batch combinations for the time window each time that the batch generator system 118 receives an indication that the classifier system 120 is idle.

When the batch generator system 118 determines that a batch is to be formed to include a yet to be received sensor system output, the batch generator system 118 can set a time deadline, wherein if the yet to be received sensor system output is not received by the time deadline, the batch generator system 118 will form the batch to consist of sensor system outputs in the buffer (e.g., to ensure that sensor system outputs are processed by the object classifier system 120 in a timely manner).

In the event that the buffer does not include a sensor system output when the batch generator system 118 receives an indication that the object classifier system 120 is idle, the batch generator system 118 waits for a next sensor system output. When the sensor system output is received, the batch generator system 118 performs the process described above.

The object classifier system 120 processes batches of sensor system outputs as they are received from the batch generator system 118 and outputs indications to the batch generator system 118 when the object classifier system 120 is idle (e.g., has completed processing of a batch). As described above, the control system 122 controls the engine 106, the braking system 108, and/or the steering system 110 of the autonomous vehicle 100 based upon labels assigned to objects represented in sensor system outputs by the object classifier system 120.

While the batch generator system 118, the object classifier system 120, and the control system 122 are illustrated in FIG. 1 as being included in the computing system 112 on the autonomous vehicle 100, other embodiments are contemplated. For example, the batch generator system 118, the object classifier system 120, and/or the control system 122 may be executed at a second computing system (not shown) that is in network communication with the computing system 112, wherein outputs of the batch generator system 118, the classifier system 120, and/or the control system 122 are provided to the computing system 112 from the second computing system over a network connection.

Figure 3:
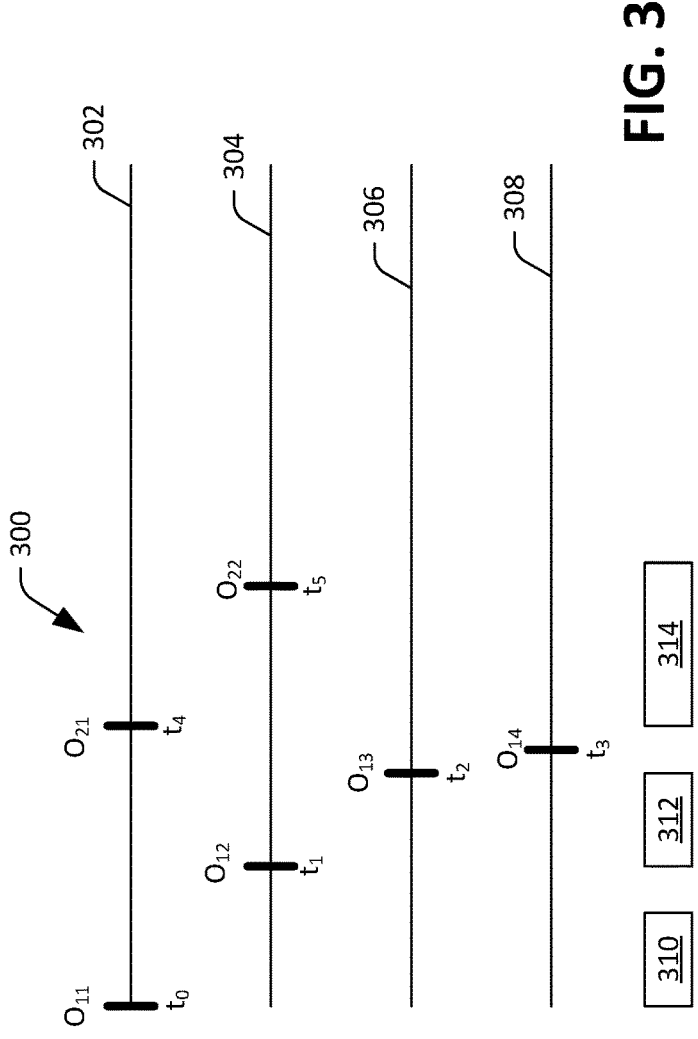
FIG. 3 depicts timing diagrams as to when sensor system outputs are received and expected to be received, and how an object classifier system processes batches of sensor system outputs based upon times that the sensor system outputs are received and expected to be received.

Further, while the batch generator system 118 has been described above as computing the average exit delay across sensor system outputs that may be included in a batch, other approaches are also contemplated. For example, the batch generator system 118 can estimate a maximum exit delay with respect to sensor system outputs that are included in proposed batches, and then batch sensor system outputs such that the maximum exit delay is minimized. This approach can, for example, avoid a scenario where the batch generator system 118 selects a batch of four sensor system outputs, where three of such outputs have very low exit delays but the fourth sensor system output has a very high exit delay (where it would be more desirable for all four sensor system outputs to have medium exit delays). Other approaches are also contemplated FIG. 3 is a timing diagram 300 that illustrates when sensor system outputs are received by the batch generator system 118, and further illustrates timing as to processing of batches of sensor system outputs by the object classifier system 120. The timing diagram 300 includes four timelines 302-308, wherein the first timeline 302 illustrates when sensor system outputs generated by a first sensor system are ready for processing by the object classifier system 120, the second timeline 304 illustrates when sensor system outputs generated by a second sensor system are ready for processing by the object classifier system 120, the third timeline 306 illustrates when a sensor system output generated by a third sensor system is ready for processing by the object classifier system 120, and the fourth timeline 308 illustrates when a sensor system output generated by a fourth sensor system is ready for processing by the object classifier system 120.

In the example shown in FIG. 3, each of the sensor systems generates sensor system outputs at the same rate. Further, for purposes of explanation, sensor system outputs are illustrated and described as being received by the batch generator system 118 precisely at the times that they are estimated to be received; it is to be understood, however, that there may be differences between estimated times of receipt and actual times of receipt (as described above). At or prior to time $t_0$, the object classifier system 120 has indicated that the object classifier system 120 is idle, and a first sensor system output from the first sensor system ($O_{11}$) is received by the batch generator system 118, as illustrated in the first timeline 302. The batch generator system 118 then determines, based upon the time estimates 124, when a sensor system output generated by the second sensor system is expected to be received. For example, the batch generator system 118 can determine that a first sensor system output from the second sensor system ($O_{12}$) is expected to be received at time $t_1$, as illustrated in the second timeline 304. The batch generator system 118 can determine that the object classifier system 120 is estimated to complete processing of a batch of size 1 prior to time $t_1$ and can accordingly provide a batch consisting of $O_{11}$ to the object classifier system 120 for processing. Block 310 depicts time taken by the object classifier system 120 to process the batch consisting of $O_{11}$, wherein the object classifier system 120 completes processing of such batch prior to $t_1$. The object classifier system 120 outputs an indication to the batch generator system 118 that the object classifier system 120 is idle responsive to the object classifier system 120 completing the processing of the batch.

At time $t_1$, the batch generator system 118 receives $O_{12}$. The buffer is empty, and accordingly the batch generator system 118 determines, based upon the time estimates 124, that a first sensor system output from the third sensor system ($O_{13}$) is expected to be received at time $t_2$, and that the object classifier system 120 is expected to complete processing of a batch of size 1 prior to time $t_2$. Hence, the batch generator system 118 provides a batch consisting of $O_{12}$ to the object classifier system 120 for processing. Block 312 depicts time taken by the object classifier system 120 to process the batch consisting of $O_{12}$, wherein the object classifier system 120 completes processing of such batch at or prior to time $t_2$, and outputs an indication to the batch generator system 118 that the object classifier system 120 is idle.

At time $t_2$, the batch generator system 118 receives $O_{13}$. The buffer is empty, and accordingly the batch generator system 118 determines, based upon the timing estimates 124, that a first sensor system output by the fourth sensor ($O_{14}$) is expected to be received at time $t_3$, and that the object classifier system 120 is estimated to be unable to complete processing of a batch of size 1 prior to time $t_3$. The batch generator system 118 further computes average exit delays for sensor system outputs in two batches based upon the timing estimates 124: a first batch consisting of $O_{13}$ and a second batch consisting of $O_{13}$ and $O_{14}$. The first average exit delay ($ED_1$) can be computed as being the estimated amount of time ($EB_1$) for the object classifier system 120 to process a batch of size 1. The second average exit delay ($ED_2$) can be computed as follows:

$$ED_2 = \frac{(t_3 - t_2) + EB_2}{2},$$

where $EB_2$ is the estimated amount of time for the object classifier system 120 to process a batch of size 2.

The batch generator system 118 can then project further into the future, and ascertain that a second sensor signal output by the first sensor ($O_{21}$) is expected to be received at time $t_4$ (e.g., which is $t_0+T$, where T is the period corresponding to the rate that sensor system outputs are generated by the sensors), and that $t_4$ is prior to the expected time that the object classifier system 120 is expected to complete processing of batches of either size 1 or size 2. Accordingly, the batch generator system 118 can compute a third average exit delay ($ED_3$) for sensor system outputs in a batch consisting of $O_{13}$, $O_{14}$, and $O_{21}$. $ED_3$ can be computed as follows:

$$ED_3 = \frac{(t_4 - t_2) + (t_4 - t_3) + EB_3}{3},$$

where $EB_3$ is the estimated amount of time for the object classifier system 120 to process a batch consisting of three sensor system outputs.

The batch generator system 118 can project still further into the future and ascertain that a second sensor system output ($O_{22}$) generated by the second sensor system is expected to be received at time $t_5$, and the batch generator system 118 can compute an average exit delay for sensor system outputs in the batch consisting of $O_{13}$, $O_{14}$, $O_{21}$, and $O_{22}$ in the manner similar to that described above. This process is repeated until a desired batch is identified.

In another exemplary embodiment, the batch generator system 118 can compute average exit delays for different batches of different sizes by reviewing numerous possible batch combinations over a predefined time window. For instance, continuing with the example set forth above, the batch generator system 118 can compute average exit delays for sensor system outputs for the following batch combinations over a window of time: [batch 1, batch 2, batch 3, and batch 4], [batch 1, batch 2, batch 5], [batch 1, batch 6], [batch 1, batch 7, batch 4], [batch 8, batch 3, batch 4], [batch 8, batch 5], [batch 9, batch 4], and [batch 10], wherein batch 1 is [$O_{13}$], batch 2 is [$O_{14}$], batch 3 is [$O_{21}$], batch 4 is [$O_{22}$], batch 5 is [$O_{21}$, $O_{22}$], batch 6 is [$O_{14}$, $O_{21}$, $O_{22}$], batch 7 is [$O_{14}$, $O_{21}$], batch 8 is [$O_{13}$, $O_{14}$], batch 9 is [$O_{13}$, $O_{14}$, $O_{21}$], and batch 10 is [$O_{13}$, $O_{14}$, $O_{21}$, $O_{22}$]. The batch generator system 118 can identify the batch combination that causes sensor system outputs included in the batches in the batch combination to have the lowest average exit delay, and can thereafter identify the first batch in the identified batch combination for provision to the object classifier system 120.

In the example illustrated in FIG. 3, at time $t_2$ the batch generator system 118 determines that the average exit delay is minimized if a batch consisting of three sensor system outputs is created once $O_{21}$ is received at time $t_4$. Block 314 depicts time taken by the object classifier system 120 to process the batch [$O_{13}$, $O_{14}$, $O_{21}$], wherein the object classifier system 120 completes processing of $O_{12}$ after time $t_5$. At $t_5$ $O_{22}$ is received at the batch generator system 118, whereupon the batch generator system 118 places $O_{22}$ in the buffer. The object classifier system 120 outputs an indication to the batch generator system 118 when processing of the batch mentioned above has completed, and the batch generator system 118 performs processing described above to identify a subsequent batch to provide to the object classifier system 120.

Figure 4:
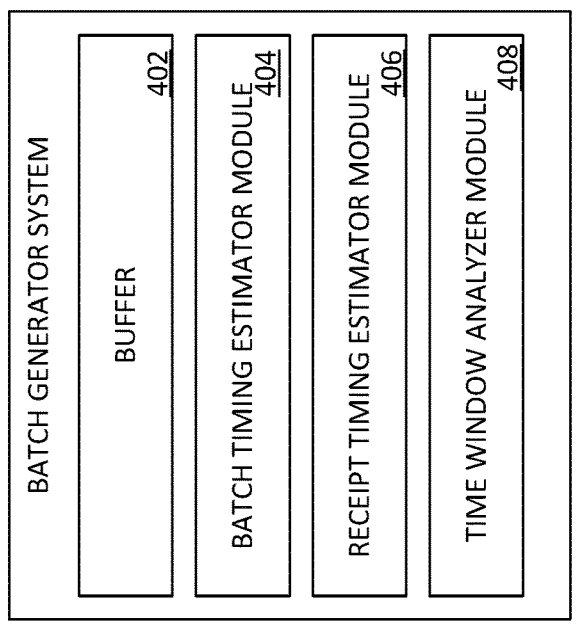
FIG. 4 is a functional block diagram of an exemplary batch generator system.

Referring now to FIG. 4, an exemplary functional block diagram of the batch generator system 118 is illustrated. The batch generator system 118 includes a buffer 402, which is configured to buffer sensor system outputs generated by the plurality of sensor systems 102-104. The batch generator system 118 also includes a batch timing estimator module 404 that is configured to estimate amounts of times needed by the object classifier system 122 to process batches of different batch sizes. For instance, the batch timing estimator module 404 can monitor processing of the object classifier system 120 over time to ascertain how long the object classifier system 120 takes to process batches of different sizes. In an example, the batch timing estimator module 404 can utilize an exponential moving average to generate such estimates, such that every time the object classifier system 120 processes a batch of sensor system outputs of a size, the batch timing estimator module 404 updates the timing estimate for batches of the size.

The batch generator system 406 also includes a receipt timing estimator module 406, wherein the receipt timing estimator module 406 is configured to generate estimates for when future sensor system outputs, generated by the sensor systems, are expected to be received. The receipt timing estimator module 406 can generate such estimates by identifying when sensor system outputs are received and adding one or more periods corresponding to the rates at which the sensor systems output sensor system outputs. Therefore, when the batch generator system 118 receives a sensor system output from a first sensor system at time to, and the period is T, the estimate for the next sensor system output for the first sensor system is $t_0+T$. When it is desirable to estimate the next several sensor system outputs from the first sensor, the period can be repeatedly added such that, for example, a time when a second sensor system output is expected to be received from the first sensor system is $t_0+2T$. Due to sensor drift and changes in preprocessing times, the sensor output timing estimator module 406 can update estimates each time a sensor system output is received from the sensor system.

The batch generator system 118 also includes a time window analyzer module 408 that sets a time window over which estimates are to be generated for sensor system outputs. In an example the time window analyzer module 408 can set the time window as the period corresponding to the sensor systems. In another example, the time window analyzer module 408 can set the time window as twice the period, three times the period, etc.

Figure 5:
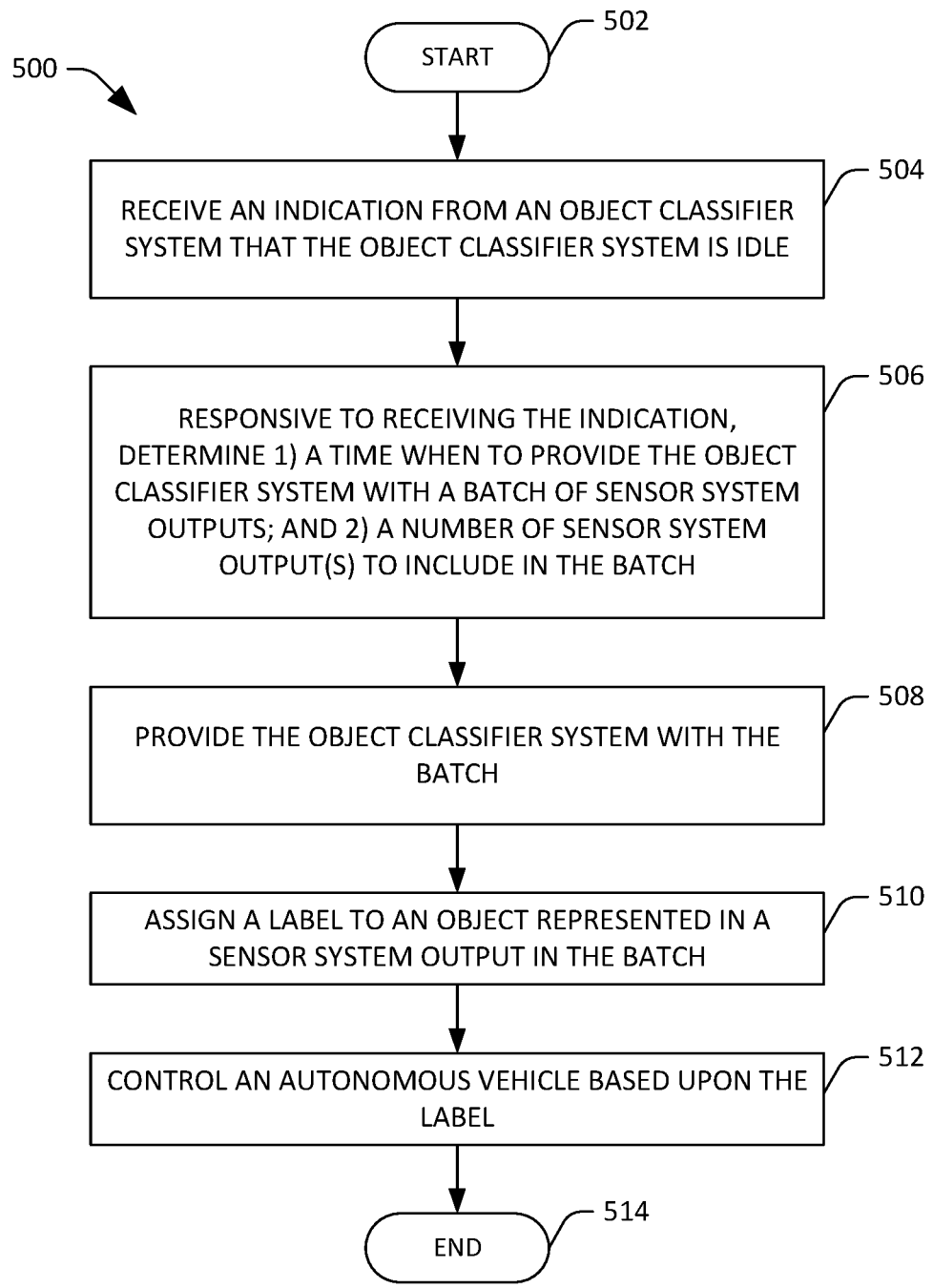
FIG. 5 is a flow diagram illustrating an exemplary methodology for controlling an autonomous vehicle.
Figure 6:
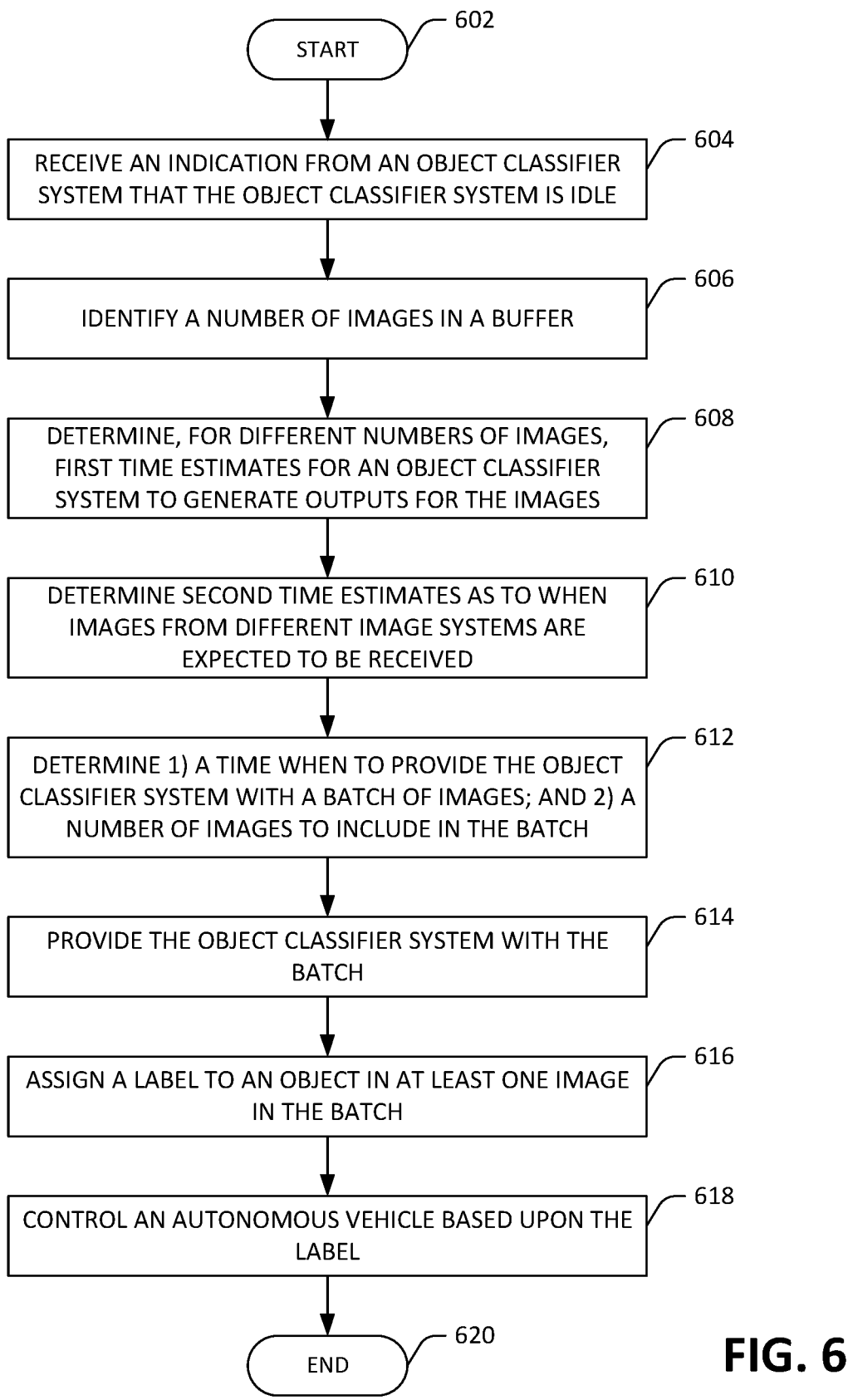
FIG. 6 is a flow diagram illustrating an exemplary methodology for controlling an autonomous vehicle.

FIGS. 5 and 6 illustrate exemplary methodologies relating to controlling an autonomous vehicle based upon image batches formed by the batch generator system 118. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 5, a flow diagram illustrating an exemplary methodology 500 is depicted, wherein the methodology is for controlling an autonomous vehicle based upon labels assigned to an object by the object classifier system 120. The methodology 500 starts at 502, and at 504, an indication is received from an object classifier system that the object classifier system is idle. For instance, the object classifier system may be idle when it has completed processing of sensor system output(s) provided to the object classifier system. At 506, responsive to receiving the indication, a determination is made as to a time when to provide the object classifier system with a batch of sensor system outputs and a number of sensor system outputs to include in the batch. As described previously, these determinations are made based upon: 1) content of a buffer (a number of sensor system outputs in the buffer and when the sensor system outputs in the buffer were received); 2) estimates of when sensor system outputs are expected to be received from several sensor systems over a time window; and 3) estimates for how long the classifier system is expected to take when processing batches of different sizes.

At 508, the classifier system is provided with the batch. At 510, the classifier system assigns a classification to an object represented in at least one of the sensor system outputs in the batch. At 512, the autonomous vehicle is controlled based upon the label assigned to the object. The methodology 500 completes at 514.

Now referring to FIG. 6, an exemplary methodology 600 for controlling an autonomous vehicle based upon labels assigned to objects represented in images captured by image systems of the autonomous vehicle is illustrated. The methodology 600 starts at 602, and at 604 an indication is received from an object classifier system that the object classifier system is idle. At 606, a number of images that are in a buffer is identified, wherein image systems of the autonomous vehicle generate images, and further wherein the images in the buffer are images generated by the image systems. Additionally, at 606, time(s) when the image(s) in the buffer were placed in the buffer are identified.

At 608, a determination is made, for different numbers of images, first time estimates as to as to amounts of time needed by the object classifier system to process different batch sizes (e.g., amounts of time needed by the object classifier system to process different numbers of images). At 610, second time estimates are determined as to when images from different image systems are expected to be received over some predetermined window of time.

At 612, a determination is made as to: 1) when to provide the object classifier system with a batch of images; and 2) a number of images to include in the batch, wherein the determination is made based upon the number of images in the buffer, the times when the images in the buffer were placed in the buffer, the first time estimates, and the second time estimates. At 614, the object classifier system is provided with the batch of images, and at 616 a label is assigned to an object represented in at least one image in the batch of images. At 618, the autonomous vehicle is controlled based upon the label assigned to the object represented in the image. The methodology 600 completes at 620.

Figure 7:
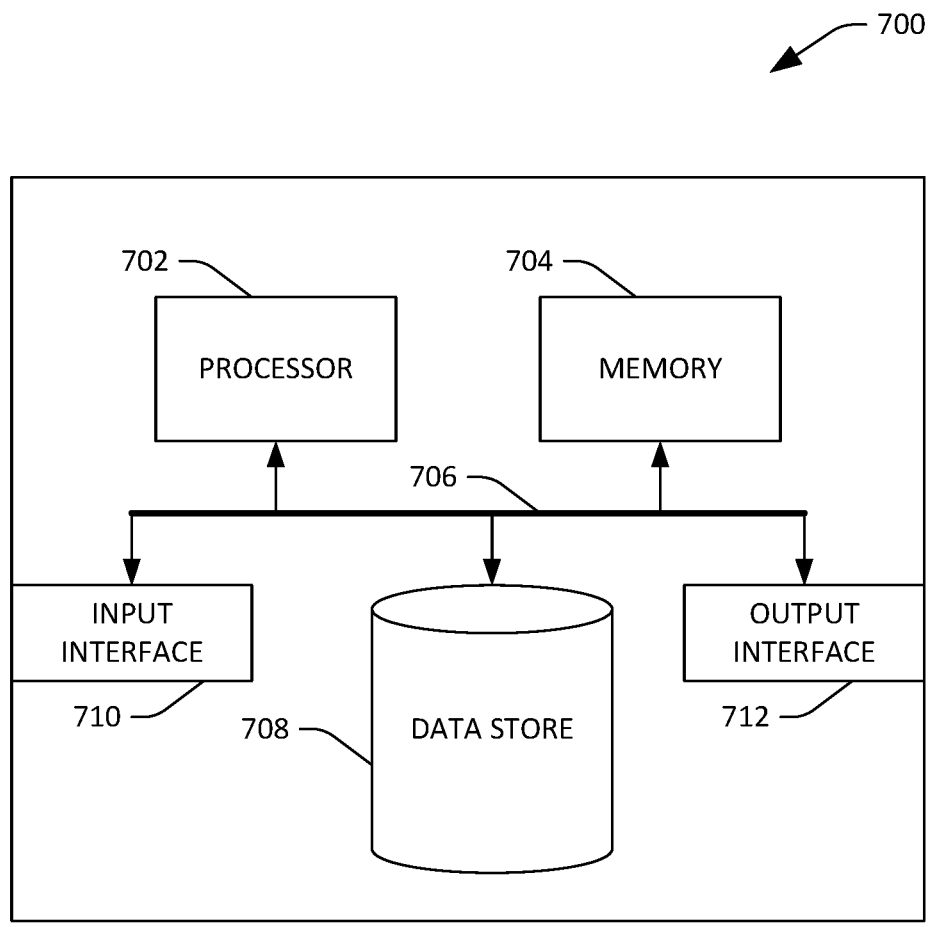
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 112. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. The processor 702 may be a GPU, a plurality of GPUs, a multi-core processor, etc. The processor 702 may access the memory 704 by way of a system bus 706. In addition to storing executable instructions, the memory 704 may also store sensory system outputs, such as images, lidar scans, radar scans, timing estimates, etc.

The computing device 700 additionally includes a data store 708 that is accessible by the processor 702 by way of the system bus 706. The data store 708 may include executable instructions, sensory system outputs, timing estimates, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the engine 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
an engine;
a braking system;
a steering system;
a plurality of sensor systems that generate a respective plurality of sensor system outputs; and
a computing system that is in communication with the engine, the braking system, the steering system, and the plurality of sensor systems, wherein the computing system comprises:
a processor; and
memory that stores instructions that, when executed by the processor, cause the processor to perform acts comprising:
receiving, from an object classifier system that is configured to assign labels to objects represented in sensor system outputs, an indication that the object classifier system is idle;
responsive to receiving the indication, determining:
a number of sensor system outputs to be included in a batch of sensor system outputs, wherein the batch is to be provided to the object classifier system, wherein each sensor system output in the batch is generated by a different sensor system in the plurality of sensor systems; and
a time when the batch is to be provided to the object classifier system; and
providing the batch to the object classifier system at the determined time, wherein the batch has the determined number of sensor outputs included therein, wherein the object classifier system assigns labels to the objects represented in the sensor systems outputs in the batch, and further wherein at least one of the engine, the braking system, or the steering system of the autonomous vehicle is controlled based upon the labels assigned to the objects.

2. The autonomous vehicle of claim 1, wherein the number of sensor system outputs to be included in the batch and the time when the batch is to be provided to the object classifier system are determined to minimize an average exit delay of the sensor system outputs over a predefined window of time, wherein an exit delay for a sensor system output is an amount of time from when the sensor system output is ready to be provided to the object classifier system and when an indication is received that the object classifier system has completed processing of the sensor system output.

3. The autonomous vehicle of claim 1, wherein determining the number of sensor system outputs in the batch of sensor system outputs comprises:
receiving, for a batch size, an amount of time expected for the object classifier system to complete processing of an arbitrary batch having the batch size, wherein the batch size represents a number of sensor system outputs in the arbitrary batch, and further wherein the amount of time is based upon the batch size; and
determining the number of sensor system outputs in the batch based upon the amount of time.

4. The autonomous vehicle of claim 3, wherein determining the number of sensor system outputs in the batch of sensor system outputs further comprises:
receiving, for a second batch size that is different from the batch size, a second amount of time expected for the object classifier system to complete processing of the arbitrary batch having the second batch size, and further wherein the second amount of time is based upon the second batch size; and
determining the number of sensor system outputs in the batch based further upon the second amount of time.

5. The autonomous vehicle of claim 3, wherein determining the number of sensor system outputs in the batch of the sensor system outputs further comprises:
identifying that there is a sensor system output in a buffer, wherein the sensor system output in the buffer is ready for provision to the object classifier system; and
determining the number of sensor system outputs in the batch based upon the at least one sensor system output being in the buffer.

6. The autonomous vehicle of claim 3, wherein determining the number of sensor system outputs in the batch of the sensor system outputs further comprises:
receiving an estimate of when an expected sensor system output is to be ready for provision to the object classifier system; and
determining the number of sensor system outputs in the batch based upon the estimate of when the expected sensor system output is to be ready for provision to the object classifier system.

7. The autonomous vehicle of claim 1, wherein determining the time when the batch is to be provided to the object classifier system comprises:
receiving a first estimate of when an expected sensor system output is to be ready for provision to the object classifier system;

receiving a second estimate of an amount of time expected for the object classifier system to process the batch; and determining the time when the batch is to be provided to the object classifier system based upon the first estimate and the second estimate.

8. The autonomous vehicle of claim 1, wherein each sensor system in the plurality of sensor systems is of a same type.

9. The autonomous vehicle of claim 8, wherein each sensor system in the plurality of sensor systems is an image system.

10. The autonomous vehicle of claim 9, wherein the sensor system outputs are images, and further wherein the image systems output the images asynchronously.

11. The autonomous vehicle of claim 1, wherein the number of sensor system outputs to be included in the batch and the time when the batch is to be provided to the object classifier system are determined based upon a rate at which the sensor systems generate the sensor system outputs.

12. A computing system of an autonomous vehicle, wherein the computing system comprises a processor and memory, wherein the memory stores instructions that, when executed by the processor, cause the processor to perform acts comprising:

receiving an indication that an object classifier system is idle;

responsive to receiving the indication, identifying a batch of sensor system outputs to provide to the object classifier system, wherein the sensor system outputs are generated by sensor systems on the autonomous vehicle, wherein the batch is identified based upon time estimates for different batch sizes, and further wherein each time estimate in the time estimates is indicative of an expected amount of time for the object classifier system to process a batch of one of the batch sizes;

providing the batch of sensor system outputs to the object classifier system subsequent to identifying the batch, wherein the object classifier system assigns labels to objects represented in each sensor system output in the batch of sensor system outputs; and controlling at least one of an engine, a steering system, or a braking system of the autonomous vehicle based upon the labels assigned to the objects by the object classifier system.

13. The computing system of claim 12, wherein the batch has a size of one sensor output to four sensor outputs.

14. The computing system of claim 12, wherein the batch includes a sensor system output that has yet to be received when the batch is identified, and further wherein the batch of the sensor system outputs is provided to the object classifier system immediately responsive to the sensor system output being received.

15. The computing system of claim 12, the acts further comprising:

subsequent to providing the batch of the sensor system outputs to the object classifier system, repeating the acts of receiving, identifying, providing, and controlling.

16. The computing system of claim 12, the acts comprising:

responsive to receiving the indication that the object classifier system is idle, determining that a buffer includes a sensor system output, wherein the batch of sensor system outputs is identified based upon the buffer including the sensor system output.

17. The computing system of claim 12, the acts further comprising:

responsive to receiving the indication that the object classifier system is idle, receiving an estimate of when a first sensor system output generated by a first sensor system is expected to be ready for processing by the object classifier system, wherein the batch of sensor system outputs is identified based upon the estimate.

18. The computing system of claim 12, wherein the batch of sensor system outputs comprises multiple sensor system outputs generated by multiple sensor systems, wherein the multiple sensor systems asynchronously generated the multiple sensor system outputs.

19. The computing system of claim 18, wherein the multiple sensor systems are image systems arranged about the autonomous vehicle, and further wherein the batch is identified based upon a rate at which the image systems output images.

20. A computing system comprising:

a processor; and memory storing instructions that, when executed by the processor, cause the processor to perform acts comprising:

identifying a batch of images that is to be provided to an object classifier system, wherein the batch of images comprises:

a first image generated by a first camera system on an autonomous vehicle; and a second image generated by a second camera system on the autonomous vehicle, wherein the first image and second image were generated at different times, and further wherein the batch is identified based upon an estimated time that a third image is expected to be received from a third camera system on the autonomous vehicle; and providing the batch of images to the object classifier system, wherein the object classifier system is configured to assign labels to objects represented in the first image and the second image, and further wherein the autonomous vehicle is controlled based upon the labels assigned to the objects by the object classifier system.

* * * * *